(12) United States Patent
Chen et al.

(10) Patent No.: US 11,032,584 B2
(45) Date of Patent: Jun. 8, 2021

(54) PICTURE STORAGE METHOD, APPARATUS AND VIDEO MONITORING SYSTEM

(71) Applicant: Hangzhou Hikvision Digital Technology Co., Ltd., Zhejiang (CN)

(72) Inventors: Peng Chen, Zhejiang (CN); Aiqiu Xu, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 40 days.

(21) Appl. No.: 16/463,651

(22) PCT Filed: Sep. 11, 2017

(86) PCT No.: PCT/CN2017/101212
§ 371 (c)(1),
(2) Date: May 23, 2019

(87) PCT Pub. No.: WO2018/095110
PCT Pub. Date: May 31, 2018

(65) Prior Publication Data
US 2019/0320212 A1  Oct. 17, 2019

(30) Foreign Application Priority Data
Nov. 23, 2016  (CN) .......................... 201611046476.4

(51) Int. Cl.
  H04N 21/231  (2011.01)
  G06F 16/538  (2019.01)
  G06F 16/58   (2019.01)
  H04N 7/18    (2006.01)
  H04N 21/239  (2011.01)
  H04N 21/274  (2011.01)
  H04N 21/6587 (2011.01)
  H04N 21/858  (2011.01)

(52) U.S. Cl.
  CPC ..... H04N 21/23113 (2013.01); G06F 16/538 (2019.01); G06F 16/5866 (2019.01);
(Continued)

(58) Field of Classification Search
None
See application file for complete search history.

(56) References Cited

U.S. PATENT DOCUMENTS

| 2009/0100106 | A1  | 4/2009 | Anthony et al. |
| 2014/0085480 | A1* | 3/2014 | Saptharishi ............ H04N 7/181 348/159 |
| 2016/0027286 | A1  | 1/2016 | Glenn et al. |

FOREIGN PATENT DOCUMENTS

| CN | 101872639 A | 10/2010 |
| CN | 101883141 A | 11/2010 |

(Continued)

OTHER PUBLICATIONS

First Office Action of the priority Chinese application No. 201611046476.4 issued by the CNIPA dated Jul. 29, 2019.
(Continued)

Primary Examiner — Omar S Parra
(74) Attorney, Agent, or Firm — Meunier Carlin & Curfman LLC

(57) ABSTRACT

The embodiments of the present application disclose a picture storage method, device and a video monitoring system, which relate to video monitoring technology field and are applied to a storage server in the video monitoring system. The method includes: receiving a picture writing request for an to-be-stored picture sent by the picture acquisition device; determining a first storage block for storing the to-be-stored picture according to the picture writing request; sending, to the picture acquisition device, a first identifier of the first storage block; receiving target picture data sent by the picture acquisition device according to the first identifier, wherein the target picture data includes the to-be-stored picture and a first capture time of the to-be-stored picture; storing the to-be-stored picture to the first storage block, determining a first storage time of the
(Continued)

to-be-stored picture, and storing the first storage time and the first capture time into a first information sub-block of the first storage block. When storing pictures by applying the solution provided by the embodiments of the present application, the probability of an incorrect retrieval result in picture retrieval can be reduced.

20 Claims, 3 Drawing Sheets

(52) U.S. Cl.
CPC ........... *H04N 7/18* (2013.01); *H04N 21/2393* (2013.01); *H04N 21/274* (2013.01); *H04N 21/6587* (2013.01); *H04N 21/858* (2013.01)

(56) References Cited

FOREIGN PATENT DOCUMENTS

| | | |
|---|---|---|
| CN | 103544217 A | 1/2014 |
| CN | 104503864 A | 4/2015 |
| CN | 104517119 A | 4/2015 |
| CN | 104699416 A | 6/2015 |
| CN | 105338027 A | 2/2016 |
| CN | 105898207 A | 8/2016 |
| EP | 3253042 | 6/2017 |
| NO | 2016119528 | 8/2016 |

OTHER PUBLICATIONS

Second Office Action of the corresponding European application No. 17874021.3-1222, dated Mar. 30, 2021.

\* cited by examiner

PICTURE STORAGE METHOD, APPARATUS AND VIDEO MONITORING SYSTEM

The present application claims the priority to a Chinese patent application No. 201611046476.4 filed with CHINA NATIONAL INTELLECTUAL PROPERTY ADMINISTRATION on Nov. 23, 2016 and entitled "PICTURE STORAGE METHOD, APPARATUS AND VIDEO MONITORING SYSTEM", which is incorporated herein by reference in its entirety.

TECHNICAL FIELD

The present invention relates to the field of video monitoring technologies, and in particular, to a picture storage method and apparatus, and a video monitoring system.

BACKGROUND

With enhancement of people's security awareness, video monitoring technology has been used widely. In video monitoring, a front-end device may continuously capture monitoring pictures for the monitored scenes so as to assist the staff to monitor the monitored scenes.

In order to monitor the monitored scenes, the front-end device may be often required to capture monitoring pictures for a long time, for example, 24 hours continuously. Thus, the front-end device will capture a large number of monitoring pictures. Since the data volume of the pictures is large, the monitoring pictures captured by the front-end device will occupy a large storage space. In addition, in practical work, the staff may not only need the monitoring picture at the current time, but also the monitoring pictures for a certain time period before the current time. Therefore, the monitoring pictures captured by the front-end device should be stored for a long time. In summary, in the prior art, the above-mentioned monitoring pictures are generally stored in a storage server of a video monitoring system, which may include multiple storage servers and thereby has a large storage space.

After the monitoring pictures are stored in the storage server, operations such as retrieving may be performed on these monitoring images. In order to facilitate retrieving the monitoring pictures, when storing the monitoring pictures to the storage server, the capture time corresponding to each monitoring picture is also saved in addition to storing each monitoring picture, so that when retrieving a monitoring picture, the monitoring picture can be retrieved based on the capture time of the picture.

The above capture time of a picture is determined by the system time of the picture capturing device, which is located in the monitored scene. Since there are many uncertain factors, the system time of the picture capturing device may be incorrect due to external factors, resulting in incorrect capture time of the pictures stored in the server, which in turn leads to incorrect retrieval result when the picture retrieval is performed based on the capture time.

SUMMARY

The embodiments of the present application disclose a picture storage method and apparatus, and a video monitoring system to reduce the probability of an incorrect retrieval result in picture retrieval.

To achieve the above objective, an embodiment of the present application discloses a picture storage method, which is applied in a storage server in a video monitoring system, wherein the video monitoring system includes a storage server and a picture acquisition device, and the method includes:

receiving, from the picture acquisition device, a picture writing request for a to-be-stored picture;

determining a first storage block for storing the to-be-stored picture according to the picture writing request;

sending, to the picture acquisition device, a first identifier of the first storage block;

receiving target picture data sent by the picture acquisition device according to the first identifier, wherein the target picture data comprises the to-be-stored picture and a first capture time of the to-be-stored picture;

storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the pictures.

In an implementation of the present application, the picture writing request carries an identifier of a first encoder corresponding to the to-be-stored picture;

the information sub-block of each storage block of the storage server further records identifiers of encoders corresponding to the pictures stored in that storage block; and the determining a first storage block for storing the to-be-stored picture according to the picture writing request comprises:

determining the first storage block for storing the to-be-stored picture according to the identifier of the first encoder and the identifiers of the encoders recorded in the information sub-blocks of each storage block of the storage server.

In an implementation of the present application, the information sub-block of each storage block of the storage server further records an earliest capture time, a latest capture time, an earliest storage time, and a latest storage time with respect to the stored pictures;

the method further includes:

updating, according to the first capture time, the earliest capture time and/or the latest capture time recorded in the first information sub-block; and updating, according to the first storage time, the earliest storage time and/or the latest storage time recorded in the first information sub-block.

In an implementation of the present application, the video monitoring system further includes a video monitoring platform, and the method further includes:

receiving a first picture downloading request sent by the video monitoring platform, wherein the first picture downloading request carries an identifier of a second encoder corresponding to a to-be-downloaded picture, a first start time, and a first end time;

determining, according to the identifier of the second encoder, a second storage block storing a picture corresponding to the second encoder;

searching, in pictures stored in the second storage block, for a picture with a capture time and/or a storage time within a range from the first start time to the first end time;

sending a searching result to the video monitoring platform;

receiving a second picture downloading request sent by the video monitoring platform according to the searching result; and reading a picture according to the second picture downloading request and the searching result, and sending the read picture to the video monitoring platform.

In an implementation of the present application, the picture storage method further includes:

sending, to the picture acquisition device, a storage result for the to-be-stored picture, so that the picture acquisition device creates a first picture download link of the to-be-stored picture according to the storage result in a case that the to-be-stored picture is successfully stored.

In an implementation of the present application, the video monitoring system further includes a video monitoring platform, and the method further includes:

receiving a third picture downloading request sent by the video monitoring platform, wherein the third picture downloading request carries a second picture download link of a to-be-downloaded picture;

parsing the second picture download link, and determining a second storage block storing the to-be-downloaded picture and a first offset of a storage location of the to-be-downloaded picture in the second storage block;

obtaining the to-be-downloaded picture from the second storage block according to the first offset, and feeding the to-be-downloaded picture back to the video monitoring platform.

In an implementation of the present application, the picture storage method further includes:

receiving a video playback request sent by the video monitoring platform, wherein the video playback request is a request for playing back a video associated with a third picture in the to be downloaded pictures;

determining a second capture time of the third picture;

determining a playback video according to the second capture time;

sending the playback video to the video monitoring platform.

In an implementation of the present application, the video monitoring system further includes a managing server, and the method further includes:

receiving a storage space release instruction sent by the managing server, wherein the storage space release instruction carries a second end time and information of an encoder corresponding to a to-be-deleted picture;

determining, according to the information of the encoder, a third storage block in which the to-be-deleted picture is stored; and deleting pictures in the third storage block with storage time earlier than the second end time, and releasing the storage space.

In an implementation of the present application, the picture storage method further includes:

receiving a stopping picture writing instruction sent by the picture acquisition device, and recycling the first storage block.

To achieve the above objective, an embodiment of the present application discloses a picture storage apparatus, which is applied in a storage server in a video monitoring system, wherein the video monitoring system includes a storage server and a picture acquisition device, and the apparatus includes:

a first request receiving module, configured for receiving, from the picture acquisition device, a picture writing request for a to-be-stored picture;

a first storage block determining module, configured for determining a first storage block for storing the to-be-stored picture according to the picture writing request;

an identifier sending module, configured for sending, to the picture acquisition device, a first identifier of the first storage block;

a data receiving module, configured for receiving target picture data sent by the picture acquisition device according to the first identifier, wherein the target picture data comprises the to-be-stored picture and a first capture time of the to-be-stored picture;

an information storage module, configured for storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the picture.

In an implementation of the present application, the picture writing request carries an identifier of a first encoder corresponding to the to-be-stored picture;

the information sub-block of each storage block of the storage server further records identifiers of encoders corresponding to the pictures stored in that storage block; and the first storage block determining module is further configured for determining the first storage block for storing the to-be-stored picture according to the identifier of the first encoder and the identifiers of the encoders recorded in the information sub-blocks of each storage block of the storage server.

In an implementation of the present application, the information sub-block of each storage block of the storage server further records an earliest capture time, a latest capture time, an earliest storage time, and a latest storage time with respect to the stored pictures;

the picture storage apparatus further comprises:

a first time updating module, configured for updating, according to the first capture time, the earliest capture time and/or the latest capture time recorded in the first information sub-block; and;

a second time updating module, configured for updating, according to the first storage time, the earliest storage time and/or the latest storage time recorded in the first information sub-block.

In an implementation of the present application, the video monitoring system further includes a video monitoring platform, and the apparatus further includes:

a second request receiving module, configured for receiving a first picture downloading request sent by the video monitoring platform, wherein the first picture downloading request carries an identifier of a second encoder corresponding to a to-be-downloaded picture, a first start time, and a first end time;

a second storage block determining module, configured for determining, according to the identifier of the second encoder, a second storage block storing a picture corresponding to the second encoder;

a picture searching module, configured for searching, in pictures stored in the second storage block, for a picture with a capture time and/or a storage time within a range from the first start time to the first end time;

a first result sending module, configured for sending a searching result to the video monitoring platform;

a third request receiving module, configured for receiving a second picture downloading request sent by the video monitoring platform according to the searching result; and a picture sending module, configured for reading a picture according to the second picture downloading request and the searching result, and sending the read picture to the video monitoring platform.

In an implementation of the present application, the picture storage apparatus further includes:

a second result sending module, configured for sending, to the picture acquisition device, a storage result for the to-be-stored picture, so that the picture acquisition device creates a first picture download link of the to-be-stored picture according to the storage result in a case that the to-be-stored picture is successfully stored.

In an implementation of the present application, the video monitoring system further includes a video monitoring platform, and the apparatus further includes:

a fourth request receiving module, configured for receiving a third picture downloading request sent by the video monitoring platform, wherein the third picture downloading request carries a second picture download link of a to-be-downloaded picture;

a link parsing module, configured for parsing the second picture download link, and determining a second storage block storing the to-be-downloaded picture and a first offset of a storage location of the to-be-downloaded picture in the second storage block;

a picture feedback module, configured for obtaining the to-be-downloaded picture from the second storage block according to the first offset, and feeding the to-be-downloaded picture back to the video monitoring platform.

In an implementation of the present application, the picture storage apparatus further includes:

a fifth request receiving module, configured for receiving a video playback request sent by the video monitoring platform, wherein the video playback request is a request for playing back a video associated with a third picture in the to be downloaded pictures;

a time determining module, configured for determining a second capture time of the third picture;

a video determining module, configured for determining a playback video according to the second capture time;

a video sending module, configured for sending the playback video to the video monitoring platform.

In an implementation of the present application, the video monitoring system further includes a managing server, and the apparatus further includes:

an instruction receiving module, configured for receiving a storage space release instruction sent by the managing server, wherein the storage space release instruction carries a second end time and information of an encoder corresponding to a to-be-deleted picture;

a third storage block determining module, configured for determining, according to the information of the encoder, a third storage block in which the to-be-deleted picture is stored;

a picture deleting module, configured for deleting pictures in the third storage block with storage time earlier than the second end time, and releasing the storage space.

In an implementation of the present application, the picture storage apparatus further includes:

an instruction receiving module, configured for receiving a stopping picture writing instruction sent by the picture acquisition device, and recycling the first storage block.

To achieve the above objective, an embodiment of the present application discloses a video monitoring system, including a managing server, a storage server, and a picture acquisition device, wherein, the picture acquisition device is configured for sending, to the managing server, a resource allocation request for a to-be-stored picture;

the managing server is configured for receiving the resource allocation request, and determining a first storage server according to the resource allocation request, and sending an identifier of the first storage server to the picture acquisition device;

the picture acquisition device is configured for receiving the identifier of the first storage server, and sending a picture writing request for the to-be-stored picture according to the received identifier;

the first storage server is configured for receiving the picture writing request, determining a first storage block for storing the to-be-stored picture according to the picture writing request; and send, to the picture acquisition device, a first identifier of the first storage block;

the picture acquisition device is configured for receiving the first identifier, generating target picture data according to the to-be-stored picture and a first capture time of the to-be-stored picture, and sending the target picture data to the first storage server according to the first identifier;

the first storage server is configured for receiving the target picture data, storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the picture.

In an implementation of the present application, the picture writing request carries an identifier of a first encoder corresponding to the to-be-stored picture;

the information sub-block of each storage block of the storage server further records identifiers of encoders corresponding to the pictures stored in that storage block; and the first storage server is further configured for determining the first storage block for storing the to-be-stored picture according to the identifier of the first encoder and the identifiers of the encoders recorded in the information sub-blocks of each storage block of the storage server.

In an implementation of the present application, the information sub-block of each storage block of the storage server further records an earliest capture time, a latest capture time, an earliest storage time, and a latest storage time with respect to the stored pictures;

the first storage server is further configured for updating, according to the first capture time, the earliest capture time and/or the latest capture time recorded in the first information sub-block; and updating, according to the first storage time, the earliest storage time and/or the latest storage time recorded in the first information sub-block.

In an implementation of the present application, the video monitoring system further includes a video monitoring platform, the video monitoring platform is configured for sending a first resource query request to the managing server, wherein the first resource query request carries an identifier of a second encoder corresponding to a to-be-downloaded picture;

the managing server is configured for receiving the first resource query request, determining a second storage server storing the to-be-downloaded picture according to the identifier of the second encoder, and sending the identifier of the second encoder to the video monitoring platform;

the video monitoring platform is configured for receiving the identifier of the second encoder, and sending a first picture downloading request to the second storage server according to the received identifier, wherein the first picture downloading request carries an identifier of a second encoder corresponding to a to-be-downloaded picture, a first start time, and a first end time;

the second storage server is configured for receiving the first picture downloading request, determining a second storage block storing a picture corresponding to the second encoder according to the identifier of the second encoder; searching, in pictures stored in the second storage block, for a picture with a capture time and/or a storage time within a range from the first start time to the first end time; and send a searching result to the video monitoring platform;

the video monitoring platform is configured for receiving the searching result and sending a second picture downloading request to the second storage server according to the searching result;

the second storage server is configured for receiving the second picture downloading request, reading a picture according to the second picture downloading request and the searching result, and sending the read picture to the video monitoring platform;

the video monitoring platform is configured for receiving the picture sent by the second storage server.

In an implementation of the present application, the first storage server is further configured for send, to the picture acquisition device, a storage result for the to-be-stored picture;

the picture acquisition device is further configured for creating a first picture download link of the to-be-stored picture according to the storage result in a case that the to-be-stored picture is successfully stored.

In an implementation of the present application, the video monitoring system further includes a video monitoring platform, the video monitoring platform is configured for sending a second resource query request to the managing server, wherein the second resource query request carries a second picture download link of the to-be-downloaded picture;

the managing server is configured for receiving the second resource query request, determining, according to the second picture download link, a second storage server storing the to-be-downloaded picture, and sending an identifier of the second storage server to the video monitoring platform;

the video monitoring platform is configured for receiving the identifier of the second storage server, and sending a third picture downloading request to the second storage server according to the received identifier, wherein the third picture downloading request carries the second picture download link;

the second storage server is configured for receiving the third picture downloading request, parsing the second picture download link, and determining a second storage block storing the to-be-downloaded picture and a first offset of a storage location of the to-be-downloaded picture in the second storage block; obtaining the to-be-downloaded picture from the second storage block according to the first offset, and feeding the to-be-downloaded picture back to the video monitoring platform;

the video monitoring platform is configured for receiving the picture fed back by the second storage server.

In an implementation of the present application, the video monitoring platform is configured for sending a video playback request to the second storage server, wherein the video playback request is a request for playing back a video associated with a third picture in the to be downloaded pictures;

the second storage server is configured for receiving the video playback request, determining a second capture time of the third picture, determining a playback video according to the second capture time, and sending the playback video to the video monitoring platform;

the video monitoring platform is configured for receiving the playback video.

In an implementation of the present application, the managing server is configured for generating a storage space release instruction when detecting that the first storage server meets a storage space release condition, wherein the storage space release instruction carries a second end time and information of an encoder corresponding to a to-be-deleted picture;

the first storage server is configured for receiving the storage space release instruction, determining, according to the information of the encoder, a third storage block in which the to-be-deleted picture is stored, and deleting pictures in the third storage block with storage time earlier than the second end time, and releasing the storage space.

In an implementation of the present application, the picture acquisition device is configured for sending a stopping picture writing instruction to the first storage server;

the first storage server is configured for receiving the stopping picture writing instruction, and recycling the first storage block.

To achieve the above objective, an embodiment of the present application discloses a server, wherein the server is a storage server in a video monitoring system, the video monitoring system includes a storage server and a picture acquisition device, where the storage server includes a processor, a communication interface, a memory, and a communication bus, wherein the processor, the communication interface, and the memory communicate with each other via the communication bus;

the memory is configured to store a computer program;

the processor is configured to implement the picture storage method described in the embodiment of the present application when executing the program stored in the memory.

To achieve the above objective, an embodiment of the present application discloses a computer readable storage medium, which is a storage medium of a storage server in a video monitoring system, wherein the video monitoring system includes a storage server and a picture acquisition device, the computer readable storage medium stores a computer program, and the computer program implements the picture storage method described in the embodiment of the present application when being executed by a processor.

To achieve the above objective, an embodiment of the present application discloses an application program, which is used to execute the picture storage method described in the embodiment of the present application when being executed.

It can be seen from the above that, in the solutions provided by each embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

BRIEF DESCRIPTION OF THE DRAWINGS

In order to illustrate the embodiments of the present application and the technical solutions of the prior art more clearly, the drawing used in the embodiments and in the prior art will be briefly introduced below. Obviously, the drawings in the following description are only for some embodiments of the application, other drawings may also be obtained from those of ordinary skill in the art without any creative efforts.

DETAILED DESCRIPTION OF THE INVENTION

In order to make the objectives, technical solutions, and advantages of the present application more comprehensible, the present application will be further described in detail below with reference to the accompanying drawings. It is apparent that the described embodiments are only a part of the embodiments of the present application, and not all of them. All other embodiments obtained by a person of ordinary skill in the art based on the embodiments of the present application without any creative efforts fall within the protection scope of the present application.

Figure 1:
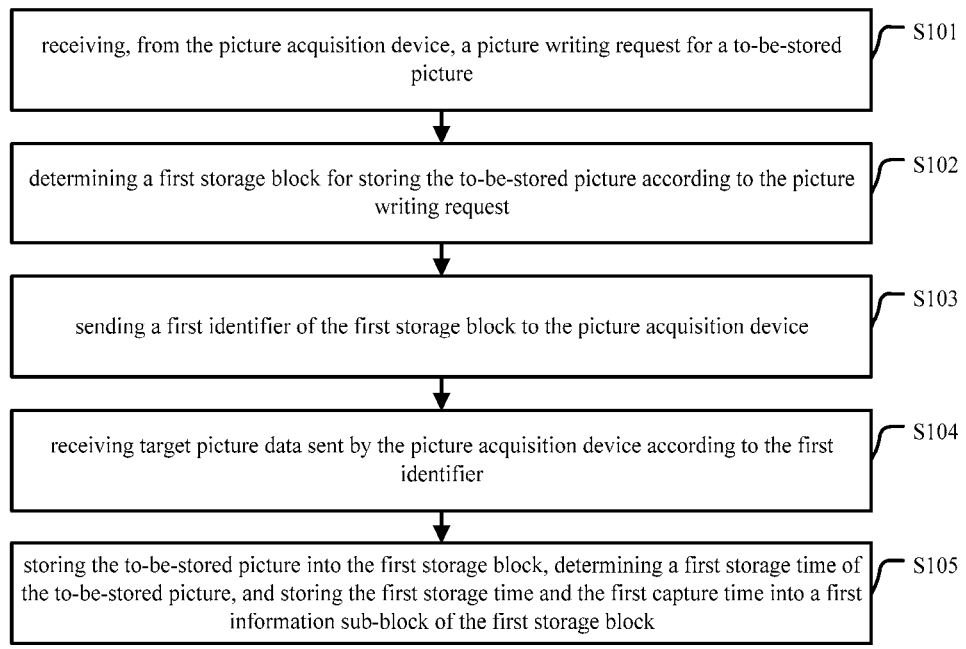
FIG. 1 is a schematic flowchart of a picture storage method according to an embodiment of the present application.

FIG. 1 is a schematic flowchart of a picture storage method according to an embodiment of the present application. The method is applied in a storage server in a video monitoring system.

The video monitoring system includes a storage server and a picture acquisition device. The picture acquisition device may be an image capturing device, such as an IP camera (IP Camera), or may be a picture accessing server, and the like. The number of the above storage server and the above picture acquisition device is not limited herein, which may be one, two or more than two. The storage server as the execution subject may be any one of the storage servers in the above-mentioned video monitoring system.

In an implementation of the present application, the video monitoring system may further include a managing server. In this case, the storage server as the execution subject may be a storage server among multiple storage servers determined by the managing server according to information such as an encoder, IPC and the like corresponding to a to-be-stored picture.

The above picture storage method includes:

S101: receiving, from the picture acquisition device, a picture writing request for a to-be-stored picture.

It can be understood by those skilled in the art that, the amount of data of pictures is large, and thus after an image capturing device captures the pictures, the captured pictures are generally compressed and encoded to reduce the occupied storage space and speed up the data transmission speed. Therefore, each picture may correspond to an encoder.

In addition, considering the network transmission speed and other factors, after a picture is captured, the image capturing device may first output the captured picture to a corresponding video pool for buffering, and then store the pictures in the video pool to the storage server based on the current network condition. Wherein, one video pool may correspond to one encoder, or may correspond to two or more encoders, which is not limited in the present application.

In view of the above, the picture writing request may carry information such as an identifier of an encoder corresponding to the to-be-stored picture, an identifier of a video pool corresponding to the to-be-stored picture, and the like.

Specifically, the picture writing request can be understood as a request for writing a to-be-stored picture into the storage server, or can be understood as a request for storing a picture to be stored in the storage server.

S102: determining a first storage block for storing the to-be-stored picture according to the picture writing request.

That is, in this step, a storage block for storing the to-be-stored picture is determined according to the picture writing request. For convenience of description, the determined storage block is referred to as a first storage block in the present application.

When data is stored in a server, the data may be stored in units of a storage block. On this basis, the storage space of the storage server in the embodiment of the present application can be understood as a storage space composed of storage blocks, wherein the number of storage blocks included in the storage space of a storage server may be 1, 2, 3, and so on.

After pictures are stored in the storage server, the staff may search for pictures that they need in the stored pictures. To facilitate searching, pictures corresponding to the same encoder may be stored in the same storage block, so that a centralized picture storage is realized to a certain extent in comparison to randomly storing pictures corresponding to encoders in storage blocks. In this way, a picture may be searched conveniently according to the identifier of the encoder, thus speeding up the searching. In addition, the same storage block may also store only the pictures corresponding to the same encoder, which further improves the concentration of the picture storage, and can more conveniently and efficiently locate the storage location of the picture when performing picture search.

Based on the above situation, the identifiers of the encoders corresponding to the pictures stored in each storage block may be recorded in the storage server, and the identifiers of the encoders corresponding to the pictures stored in each storage block may also be recorded in that storage block. In an implementation of the present application, when an identifier of a first encoder corresponding to a to-be-stored picture is carried in the picture writing request, the identifier of the first encoder can be matched with the identifiers stored in the storage server or the first storage block, so as to determine the first storage block for storing the to-be-stored picture.

S103: sending a first identifier of the first storage block to the picture acquisition device.

That is, in this step, the identifier of the first storage block is sent to the picture acquisition device. For convenience of description, the identifier of the first storage block is referred to as a first identifier in the present application.

After receiving the first identifier, the picture acquisition device establishes a data channel connection with the storage server, and can send picture data to the storage server through the connection.

S104: receiving target picture data sent by the picture acquisition device according to the first identifier.

It will be understood by those skilled in the art that each picture has a capture time, which is determined according to the system time of the picture acquisition device. When searching in the storage server for a picture, it may need to search for a picture captured at a certain time or pictures captured during a certain time period. In the case where the system time of the picture acquisition device is correct, the above capture time can accurately reflect the time at which the picture is captured, and therefore, the capture time of a picture may be stored together with the picture.

Therefore, the target picture data may include a to-be-stored picture and a capture time of the to-be-stored picture. For convenience of description, the capture time of a to-be-stored picture in the present application is referred to as a first capture time, and of course, the target picture data can also include information such as the picture size of the to-be-stored picture, which is not limited in this application.

Specifically, the target picture data may be sent to the storage device by the picture acquisition device according to a preset network protocol. Therefore, the target picture data may be in a form of a data packet. In this case, the first capture time may be included in the packet header of the data packet. In addition, the packet header of the data packet may further include information such as the size of the to-be-stored picture.

S105: storing the to-be-stored picture into the first storage block, determining a first storage time of the to-be-stored picture, and storing the first storage time and the first capture time into a first information sub-block of the first storage block.

A storage time of a to-be-stored picture is created in the process of storing the to-be-stored picture. For convenience of description, a storage time of a to-be-stored picture in the present application is referred to as a first storage time.

After receiving the target picture data, the storage server may parse the data to obtain the to-be-stored picture and information such as the first capture time and the like, and then store the to-be-stored picture and information such as the first capture time and the first storage time.

It should be noted that the present application does not limit the order in which the to-be-stored picture, the first capture time, and the first storage time are stored. In addition, storing the to-be-stored picture in the first storage block and storing the first capture time and the first storage time in the first information sub-block are considered as a complete storage process.

Specifically, the first storage time may be a time at which the storage server receives the target picture data, or may be a time at which the storage server confirms that the storing of the to-be-stored picture is completed. It can be seen that the first storage time is determined by the system time of the storage server.

Since the storage time of a picture reflects a time at which the picture is actually stored, and the system time of the storage server generally has a high accurate, which leads to a low error rate. Further, since system time errors could occur in the front-end picture acquisition device due to various environmental factors, in order to ensure that the subsequent picture searching has a higher accuracy, when storing pictures, it is necessary to store the storage time of the picture together.

Based on the above situation, in addition to pictures, each storage block of the storage server may include information sub-blocks, which are used to record a corresponding relationship of the pictures stored in each storage block with the respective storage time and capture time of the pictures. Specifically, the first information sub-block is one information sub-block in the first storage block.

In an implementation of the present application, in addition to the corresponding relationship, the information sub-block may further record an identifier of an encoder corresponding to each of the pictures stored in the storage block. On this of basis, in the case that the picture writing request carries an identifier of a first encoder corresponding to a to-be-stored picture, when determining the first storage block for storing the to-be-stored picture according to the picture writing request, the first storage block for storing the to-be-stored picture can be determined according to the identifier of the first encoder and the identifier of the encoder recorded in the information sub-block of each storage block of the storage server.

Specifically, first, storage blocks that record the same identifier of an encoder as the identifier of the first encoder is determined from storage blocks of the storage server according to identifiers of encoders recorded in information sub-blocks of the storage blocks of the storage server, and then a first storage block for storing a to-be-stored picture is selected from the determined storage blocks.

In an implementation of the present application, in addition to the corresponding relationship and the identifiers of the encoders, the information sub-block of storage blocks of the storage server may also record an earliest capture time, a latest capture time, and an earliest storage time and a latest storage time with respect to the stored pictures.

In this case, in addition to storing the first storage time and the first capture time to the first information sub-block, the earliest capture time and/or the latest capture time recorded in the first information sub-block may be updated according to the first capture time, and the earliest storage time and/or the latest storage time recorded in the first information sub-block may be updated according to the first storage time.

The following describes how to update the information in the first information sub-block by using a specific example.

It is assumed that before a first storage block stores a picture for the first time, the earliest capture time, the latest capture time, the earliest storage time, and the latest storage time stored in the first information sub-block are all zero.

A capture time of a first picture that is stored is: 2016.11.10 12:00, and the storage time thereof is: 2016.11.10 12:01.

A capture time of a second picture that is stored is: 2016.11.10 12:15, and the storage time thereof is: 2016.11.10 12:16.

A capture time of a third picture that is stored is: 2016.11.10 11:15, and the storage time thereof is: 2016.11.10 11:16 (the system time of the picture acquisition device is abnormal, and the system time of the storage server is abnormal)

Then, the earliest capture time, the latest capture time, the earliest storage time, and the latest storage time stored in the first information sub-block after updating are as shown in Table 1 below.

TABLE 1

|  | Earliest capture time | Latest capture time | Earliest storage time | Latest storage time |
| --- | --- | --- | --- | --- |
| Initial state | 0 | 0 | 0 | 0 |
| Storing the 1$^{st}$ picture | 2016.11.10 12:00 | 2016.11.10 12:00 | 2016.11.10 12:01 | 2016.11.10 12:01 |
| Storing the 2$^{nd}$ picture | 2016.11.10 12:00 | 2016.11.10 12:15 | 2016.11.10 12:01 | 2016.11.10 12:16 |
| Storing the 3$^{rd}$ picture | 2016.11.10 11:15 | 2016.11.10 12:15 | 2016.11.10 11:16 | 2016.11.10 12:16 |

The storage block will be described below by way of a specific example.

The first storage block can store data in the following format:

public information, first picture information, second picture information, . . . , first picture data, second picture data . . . .

The above public information may include a earliest capture time, a latest capture time, a earliest storage time, and a latest storage time, as well as an identifier of an encoder corresponding to the stored picture;

The first picture information may include a capture time and a storage time of a first picture.

The second picture information may include a capture time and a storage time of a second picture.

The video monitoring system may further include a video monitoring platform. The video monitoring platform may be understood as a client used by the staff to obtain monitoring information. In actual work, the staff may download pictures stored in the storage server through the video monitoring platform. The following describes how to download pictures from the storage server through two embodiments of FIG. 2 and FIG. 3.

Figure 2:
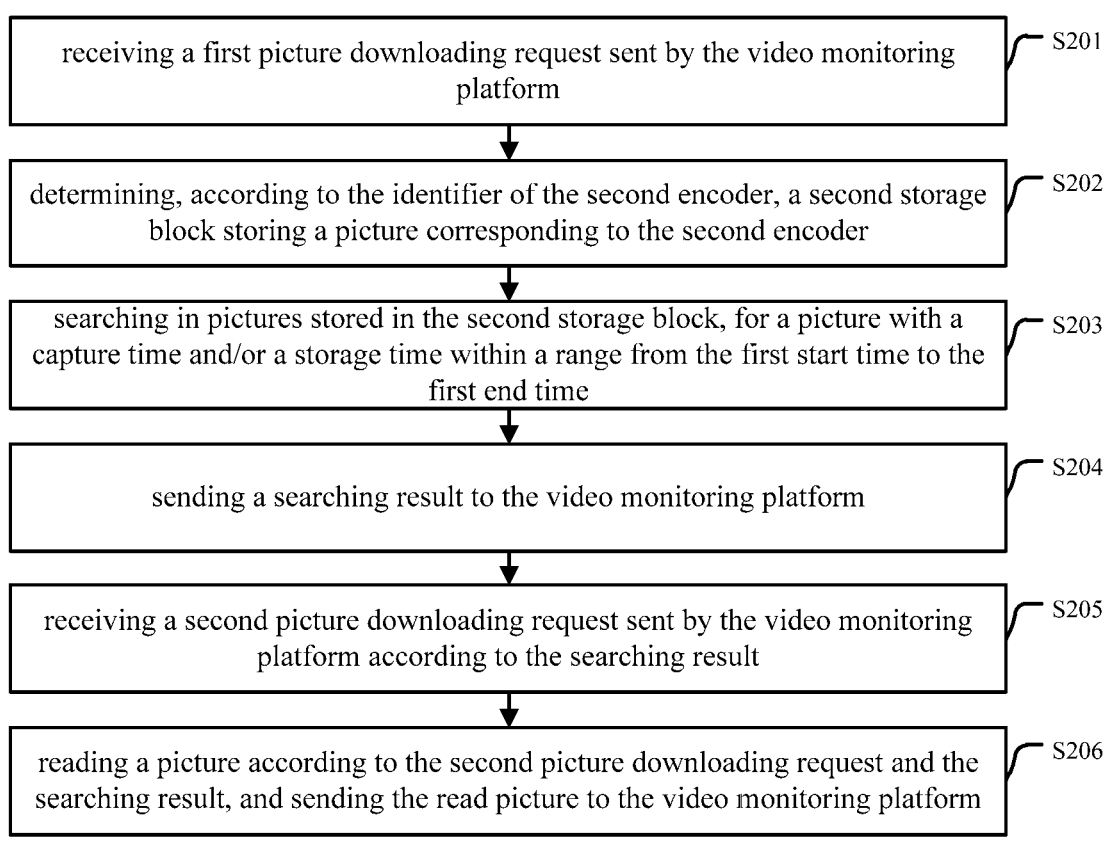
FIG. 2 is a schematic flowchart of a picture downloading method according to an embodiment of the present application.

In an implementation of the present application, referring to FIG. 2, a schematic flowchart of a picture downloading method is provided, where the method includes:

S201: receiving a first picture downloading request sent by the video monitoring platform.

It should be noted that, for convenience of description, an encoder corresponding to a to-be-downloaded picture in the present application is referred to as a second encoder.

The first picture downloading request carries an identifier of a second encoder corresponding to a to-be-downloaded picture, a first start time, and a first end time.

S202: determining, according to the identifier of the second encoder, a second storage block storing a picture corresponding to the second encoder.

Since an identifier of a encoder corresponding to a picture stored in the storage block can be recorded in an information sub-block of each storage block of the storage server, the identifier of the second encoder can be matched with an identifier of an encoder recorded in the information sub-block, to determine a storage block in which the picture corresponding to the second encoder is stored. For convenience of description, the determined storage block in the present application is referred to as a second storage block.

S203: searching in pictures stored in the second storage block, for a picture with a capture time and/or a storage time within a range from the first start time to the first end time.

Generally, the staff searches for pictures based on the time when the pictures are captured by the image capturing device. Therefore, in an implementation of the present application, when searching for a picture, the search may be performed only in the second storage block according to the capture time.

However, as mentioned above, the system time of the image capturing device could be abnormal due to environmental factors, and the system time of the storage server is relatively stable. Therefore, in an implementation of the present application, when searching for a picture, it is also possible to perform a search in the second storage block based only on the storage time.

Furthermore, although the system time of the storage server is relatively stable, due to network delay and other factors, even if the system time of the image capturing device and the system time of the storage server are correct, there may also be a large difference between the picture capture time and the storage time. Therefore, in an implementation of the present application, when searching for a picture, the search may be performed in the second storage block according to the capture time and the storage time.

Since the information sub-block of each storage block of the storage server can record the earliest capture time, the latest capture time, the earliest storage time, and the latest storage time of the stored picture, in addition to the corresponding relationship and the identifier of the encoder, it is also possible to search in the pictures stored in the second storage block for a picture with a capture time and/or a storage time within a range from the first start time to the first end time based on a combination of the above earliest capture time, latest capture time, earliest storage time and latest storage time.

For example, a first start time is: 2016.11.10 10:00.

A first end time is: 2016.11.10 11:00.

If the earliest capture time of the second storage block is: 2016.11.10 9:00, and the latest capture time is: 2016.11.10 12:00, it can be determined that there is a picture in the second storage block that meets the requirement, and it can continue to search for the picture in the second storage block.

If the earliest capture time of the second storage block is: 2016.11.10 13:00, and the latest capture time is: 2016.11.10 15:00, it can be determined that there is no picture in the second storage block that meets the requirement, and there is no need to continue to search for a picture in the second storage block.

In summary, it can be seen that the picture searching can be speeded up according to the earliest capture time and the latest capture time of the storage block.

The manner of performing picture searching according to the earliest storage time and the latest storage time of the storage block is similar to the above example, and will not be enumerated here.

S204: sending a searching result to the video monitoring platform.

S205: receiving a second picture downloading request sent by the video monitoring platform according to the searching result.

S206: reading a picture according to the second picture downloading request and the searching result, and sending the read picture to the video monitoring platform.

It can be seen from above that the solution provided by the embodiment shown in FIG. 2 can implement batch downloading of pictures, and can locate pictures to be downloaded according to the capture time and/or storage time of the pictures quickly and accurately.

After the storage server stores the to-be-stored picture, the storage server may also feed back a storage result for the to-be-stored picture to the picture acquisition device. After receiving the storage result, the picture acquisition device determines, according to the storage result, whether the to-be-stored picture is successfully stored. If the storage is successful, a first picture download link of the to-be-stored picture may be created according to the storage result, so that when there is need to download this picture subsequently, the picture may be downloaded according to the first picture download link.

It should be noted that the above first picture download link is a download link of the to-be-stored picture.

Specifically, the above storage result may include an offset of the to-be-stored picture in the first storage block, and may further include information such as the identifier of the first storage block, the identifier of the first storage server, and the like, which is not limited in the present application. The first storage server is a server where the first storage block is located.

When the picture acquisition device creates a first picture download link, in addition to the above offset, the identifier of the first storage server and the identifier of the first storage block may also be taken into account.

Specifically, after the foregoing picture acquisition device creates the first picture download link, the first picture download link may be sent to the video monitoring platform, the managing server, etc., so that when the staff downloads the to-be-stored picture through the video monitoring platform, the picture can be downloaded according to the first picture download link.

Figure 3:
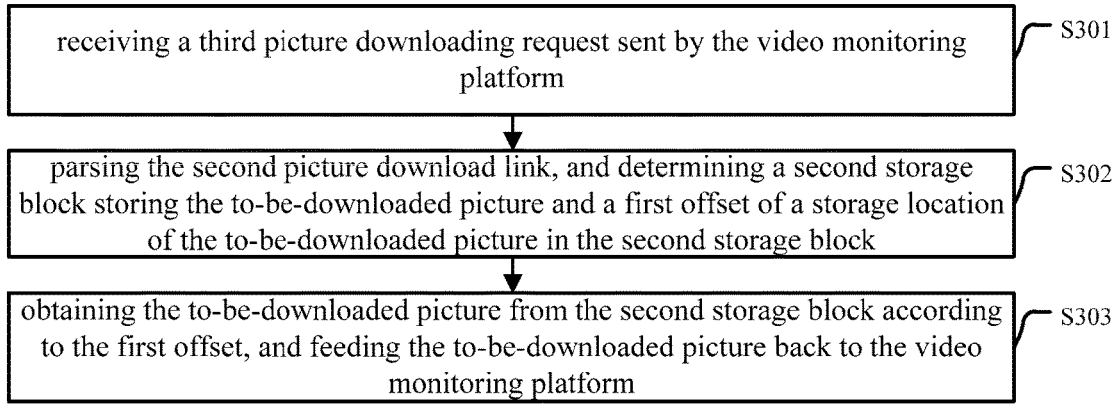
FIG. 3 is a schematic flowchart of another picture downloading method according to an embodiment of the present application.

Based on the above, in an implementation of the present application, referring to FIG. 3, a schematic flowchart of another picture download method is provided, where the method includes:

S301: receiving a third picture downloading request sent by the video monitoring platform.

The third picture downloading request carries a second picture download link of a to-be-downloaded picture.

That is, the above third picture downloading request carries a picture download link of a to-be-downloaded picture. In order to distinguish from other picture download links, a picture download link carried in the third picture downloading request is referred to as a second picture download link in the present application.

S302: parsing the second picture download link, and determining a second storage block storing the to-be-downloaded picture and a first offset of a storage location of the to-be-downloaded picture in the second storage block.

That is, after the second picture download link is parsed in this step, the storage block storing the to-be-downloaded picture is determined. For convenience of description, the determined storage block is referred to as a second storage block. In addition to determining the second storage block, the offset of the storage location of the to-be-downloaded picture in the second storage block is also determined. For convenience of description, the offset determined in the present application is referred to as a first offset.

S303: obtaining the to-be-downloaded picture from the second storage block according to the first offset, and feeding the to-be-downloaded picture back to the video monitoring platform.

It can be seen from the above that the solution provided by the embodiment shown in FIG. 3 can realize accurate downloading of a single picture.

In actual work, the staff may need to view a video associated with a picture in addition to a picture. In an implementation of the present application, the storage server may further receive a video playback request sent by the video monitoring platform, wherein the video playback request is a request for playing a video associated with the third picture in the to be downloaded pictures; determine a second capture time of the third picture; determine a playback video according to the second capture time; and send the playback video to the video monitoring platform.

It should be noted that the third picture may be understood as any one of the to be downloaded pictures, and the second capture time is the time at which the third picture is captured.

Specifically, the video playback request may carry information such as the identifier of the encoder corresponding to the third picture, the second capture time of the third picture, and the like. The determining the playback video according to the second capture time may include firstly determining an encoder corresponding to the third picture (referred to as a third encoder in the present application for convenience of description) according to the identifier of the encoder corresponding to the third picture; Taking a video, which corresponds to the second capture time and the third encoder, with a starting time of the second capture time carried in the video playback request or an ending time of the second capture time as the playback video.

The video monitoring system can include multiple storage servers, so that the storage space is much larger than that of a single physical machine, but the storage space is still limited for the video monitoring system. In addition, from the perspective of picture storage, the front-end image capturing device will continuously captures pictures over time, so that the demand for storage space will become larger and larger; and from the perspective of picture searching, a user's requirement for pictures that are stored for a long time could be less often, therefore the probability of searching is low. Based on the above two reasons, the storage space of the storage server can be released according to certain rules to ensure sufficient storage space when storing pictures.

In view of the above, in an implementation of the present application, when the video monitoring system further includes a managing server, the storage server may further receive a storage space release instruction sent by the managing server, wherein the storage space release instruction carries a second end time and information of an encoder corresponding to a picture to be deleted; determine, according to the encoder information, a third storage block in which the picture to be deleted is stored; and delete pictures in the third storage block whose storage time is earlier than the second end time to release the storage space.

Specifically, the above encoder information may be an identifier of an encoder or the like, which is not limited by the present application, as long as the encoder can be uniquely determined, for example, a network address of the encoder and the like.

The storage space release instruction is generated by the managing server. Specifically, the managing server monitors the storage space of each storage server. When the storage server is detected to meet the storage space release rule, the storage space release instruction may be generated.

The storage space release rule may be as follows. The storage space release rule is satisfied when the remaining storage space of the storage server is less than a first preset threshold.

The above storage space release rule may be as follows. The storage space release rule is satisfied when the time interval from the last releasing of storage space reaches a second preset threshold.

Certainly, the present application only takes the above examples for illustration, and the storage space release rule in actual application is not limited to the above. In addition, from the above examples, the storage space in the storage server is cyclically released, but the release period is different. Therefore, the above process may also be referred to as: cyclical storage space release.

In addition, after receiving the storage space release instruction, the storage server may further send an acknowledgement message to the managing server, so that the managing server can confirm that the storage server receives the storage space release instruction.

In an implementation of the present application, the picture acquisition device may further send a stopping picture writing instruction to the storage server. After the storage server receives the stopping picture writing instruction, the first storage block may be recycled, so that the picture acquisition device can no longer store pictures to the first storage block. In other words, the storage server refuses to respond to a request from the picture acquisition device for storing pictures. If the picture acquisition device wants to store pictures again to the storage server, it has to request the storage server to reallocate a storage block to store pictures again. When the storage server reallocates a storage block, the allocated storage block may still be the first storage block or may not be the first storage block. In this implementation, the storage server can release the first storage block timely.

In an implementation of the present application, each storage server may periodically feed back information about pictures stored in each storage block to the managing server, for example, identifiers of encoders corresponding to the stored pictures in the storage block, the earliest capture time, the latest capture time, the earliest storage time, the latest storage time of the stored pictures, the capture time and storage time of each stored pictures, and the like. In this way, the managing server can implement management of the storage server according to the above information.

It can be seen from the above that, in the solutions provided by each embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

Corresponding to the above picture storage method, an embodiment of the present application further provides a picture storage apparatus.

Figure 4:
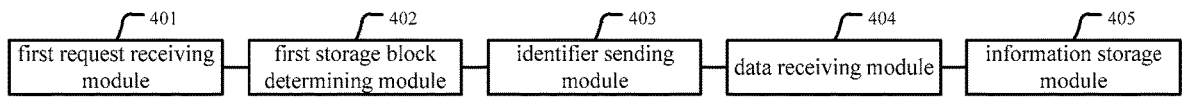
FIG. 4 is a schematic structural diagram of a picture storage device according to an embodiment of the present application.

FIG. 4 is a schematic structural diagram of a picture storage apparatus according to an embodiment of the present application, wherein the apparatus is applied in a storage server in a video monitoring system, the video monitoring system includes a storage server and a picture acquisition device, and the apparatus includes:

a first request receiving module 401, configured for receiving, from the picture acquisition device, a picture writing request for a to-be-stored picture;

a first storage block determining module 402, configured for determining a first storage block for storing the to-be-stored picture according to the picture writing request;

an identifier sending module 403, configured for sending, to the picture acquisition device, a first identifier of the first storage block;

a data receiving module 404, configured for receiving target picture data sent by the picture acquisition device according to the first identifier, wherein the target picture data comprises the to-be-stored picture and a first capture time of the to-be-stored picture;

an information storage module 405, configured for storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the picture.

Specifically, the picture writing request carries an identifier of a first encoder corresponding to the to-be-stored picture;

the information sub-block of each storage block of the storage server further records identifiers of encoders corresponding to the pictures stored in that storage block; and the first storage block determining module 402 is specifically configured for determining the first storage block for storing the to-be-stored picture according to the identifier of the first encoder and the identifiers of the encoders recorded in the information sub-blocks of each storage block of the storage server.

Specifically, the information sub-block of each storage block of the storage server further records an earliest capture time, a latest capture time, an earliest storage time, and a latest storage time with respect to the stored pictures;

the picture storage apparatus may further include:

a first time updating module, configured for updating, according to the first capture time, the earliest capture time and/or the latest capture time recorded in the first information sub-block; and;

a second time updating module, configured for updating, according to the first storage time, the earliest storage time and/or the latest storage time recorded in the first information sub-block.

The video monitoring system may further include a video monitoring platform. The video monitoring platform may be understood as a client used by the staff to obtain monitoring information. In actual work, the staff may download pictures stored in the storage server through the video monitoring platform. The following describes how to download pictures from the storage server through two embodiments of FIG. 5 and FIG. 6.

Figure 5:
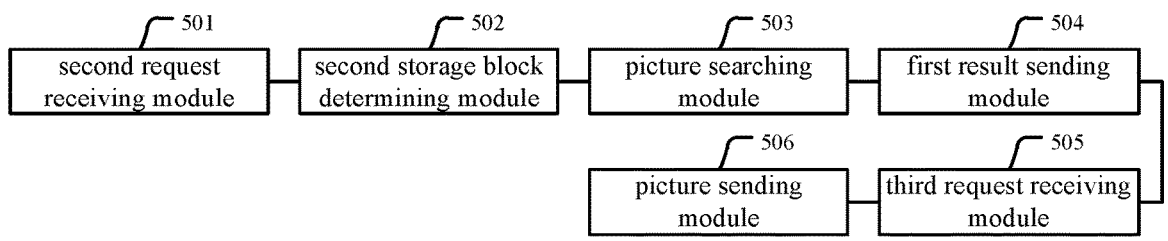
FIG. 5 is a schematic structural diagram of a picture downloading device according to an embodiment of the present application.

In an implementation of the present application, referring to FIG. 5, a schematic structural diagram of a picture downloading apparatus is provided, which includes:

a second request receiving module 501, configured for receiving a first picture downloading request sent by the video monitoring platform, wherein the first picture downloading request carries an identifier of a second encoder corresponding to a to-be-downloaded picture, a first start time, and a first end time;

a second storage block determining module 502, configured for determining, according to the identifier of the second encoder, a second storage block storing a picture corresponding to the second encoder;

a picture searching module 503, configured for searching, in pictures stored in the second storage block, for a picture with a capture time and/or a storage time within a range from the first start time to the first end time;

a first result sending module 504, configured for sending a searching result to the video monitoring platform;

a third request receiving module 505, configured for receiving a second picture downloading request sent by the video monitoring platform according to the searching result;

a picture sending module 506, configured for reading a picture according to the second picture downloading request and the searching result, and sending the read picture to the video monitoring platform.

It can be seen from above that the solution provided by the embodiment shown in FIG. 5 can implement batch downloading of pictures, and can locate the to-be-downloaded picture according to the capture time and/or storage time of the picture quickly and accurately.

After the storage server stores the to-be-stored picture, the storage server may also feed back a storage result for the to-be-stored picture to the picture acquisition device. After receiving the storage result, the picture acquisition device determines, according to the storage result, whether the to-be-stored picture is successfully stored. If the storage is successful, a first picture download link of the to-be-stored picture may be constructed according to the storage result, so that when there is need to download this picture in a later stage, the picture may be downloaded according to the first picture download link.

Specifically, the above storage result may include an offset of the to-be-stored picture in the first storage block, and may further include information such as the identifier of the first storage block, the identifier of the first storage server, and the like, which is not limited in the present application.

When the picture acquisition device creates the first picture download link, in addition to the above offset, the identifier of the first storage server and the identifier of the first storage block may also be considered.

Specifically, after the foregoing picture acquisition device creates the first picture download link, the first picture download link may be sent to the video monitoring platform, the managing server, etc., so that when the staff downloads the to-be-stored picture through the video monitoring platform, the picture can be downloaded according to the first picture download link.

In an implementation of the present application, the picture storage apparatus further includes:

a second result sending module, configured for sending, to the picture acquisition device, a storage result for the to-be-stored picture, so that the picture acquisition device creates a first picture download link of the to-be-stored picture according to the storage result in a case that the to-be-stored picture is successfully stored.

Figure 6:
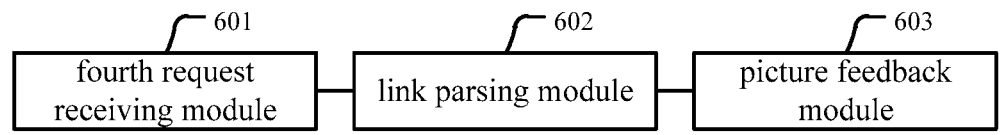
FIG. 6 is a schematic structural diagram of another picture downloading device according to an embodiment of the present application.

Based on the above situation, in an implementation of the present application, referring to FIG. 6, a schematic structural diagram of another picture storage apparatus is provided, which includes:

a fourth request receiving module 601, configured for receiving a third picture downloading request sent by the video monitoring platform, wherein the third picture downloading request carries a second picture download link of a to-be-downloaded picture;

a link parsing module 602, configured for parsing the second picture download link, and determining a second storage block storing the to-be-downloaded picture and a first offset of a storage location of the to-be-downloaded picture in the second storage block;

a picture feedback module 603, configured for obtaining the to-be-downloaded picture from the second storage block according to the first offset, and feeding the to-be-downloaded picture back to the video monitoring platform.

It can be seen from the above that the solution provided by the embodiment shown in FIG. 6 can realize accurate downloading of a single picture.

In an implementation of the present application, the picture storage apparatus may further include:

a fifth request receiving module, configured for receiving a video playback request sent by the video monitoring platform, wherein the video playback request is a request for playing back a video associated with a third picture in the to be downloaded pictures;

a time determining module, configured for determining a second capture time of the third picture;

a video determining module, configured for determining a playback video according to the second capture time;

a video sending module, configured for sending the playback video to the video monitoring platform.

In an implementation of the present application, the video monitoring system may further include a managing server, and the apparatus further includes:

an instruction receiving module, configured for receiving a storage space release instruction sent by the managing server, wherein the storage space release instruction carries a second end time and information of an encoder corresponding to a to-be-deleted picture;

a third storage block determining module, configured for determining, according to the information of the encoder, a third storage block in which the to-be-deleted picture is stored;

a picture deleting module, configured for deleting pictures in the third storage block with storage time earlier than the second end time, and releasing the storage space.

In an implementation of the present application, the picture storage apparatus may further include:

an instruction receiving module, configured for receiving a stopping picture writing instruction sent by the picture acquisition device, and recycling the first storage block.

It can be seen from the above that, in the solutions provided by each embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

Corresponding to the above picture storage apparatus, an embodiment of the present application further provides a video monitoring system.

Figure 7:
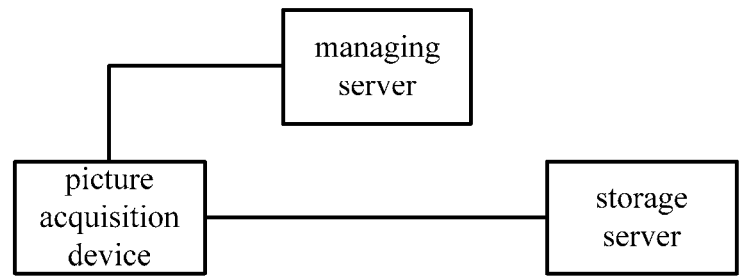
FIG. 7 is a schematic structural diagram of a video monitoring system according to an embodiment of the present application.

FIG. 7 is a schematic structural diagram of a video monitoring system according to an embodiment of the present application, wherein the video monitoring system includes a managing server, a storage server, and a picture acquisition device, and wherein, the picture acquisition device is configured for sending, to the managing server, a resource allocation request for a to-be-stored picture;

the managing server is configured for receiving the resource allocation request, and determining a first storage server according to the resource allocation request, and sending an identifier of the first storage server to the picture acquisition device;

the picture acquisition device is configured for receiving the identifier of the first storage server, and sending a picture writing request for the to-be-stored picture according to the received identifier;

the first storage server is configured for receiving the picture writing request, determining a first storage block for storing the to-be-stored picture according to the picture writing request; and send, to the picture acquisition device, a first identifier of the first storage block;

the picture acquisition device is configured for receiving the first identifier, generating target picture data according to the to-be-stored picture and a first capture time of the to-be-stored picture, and sending the target picture data to the first storage server according to the first identifier;

the first storage server is configured for receiving the target picture data, storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the picture.

The resource allocation request may carry information such as an identifier of an encoder corresponding to the to-be-stored picture, an identifier of a video pool corresponding to the to-be-stored picture.

Each storage server may periodically feed back information of the pictures stored in each storage block to the managing server, for example, the identifier of the encoder corresponding to the stored pictures in the storage block, the earliest capture time, the latest capture time, the earliest storage time, the latest storage time of the stored pictures, the capture time and storage time of the stored pictures, and the like.

After receiving the resource allocation request, the managing server can consider the information carried in the resource allocation request, the information fed back periodically by the storage server and at least one of the following information, so as to determine the first storage server:

the remaining storage capacity of each storage server;

the storage period of each storage server;

the storage mode corresponding to the to-be-stored picture, for example, collective storage mode or scattering storage mode.

The present application only takes the above examples for illustration, and the ways to determine the first storage server in actual application is not limited to the above.

In an implementation of the present application, the picture writing request carries an identifier of a first encoder corresponding to the to-be-stored picture;

the information sub-block of each storage block of the storage server further records identifiers of encoders corresponding to the pictures stored in that storage block; and the first storage server is further configured for determining the first storage block for storing the to-be-stored picture according to the identifier of the first encoder and the identifiers of the encoders recorded in the information sub-blocks of each storage block of the storage server.

In an implementation of the present application, the information sub-block of each storage block of the storage server further records an earliest capture time, a latest capture time, an earliest storage time, and a latest storage time with respect to the stored pictures;

the first storage server is further configured for updating, according to the first capture time, the earliest capture time and/or the latest capture time recorded in the first information sub-block; and updating, according to the first storage time, the earliest storage time and/or the latest storage time recorded in the first information sub-block.

Figure 8:
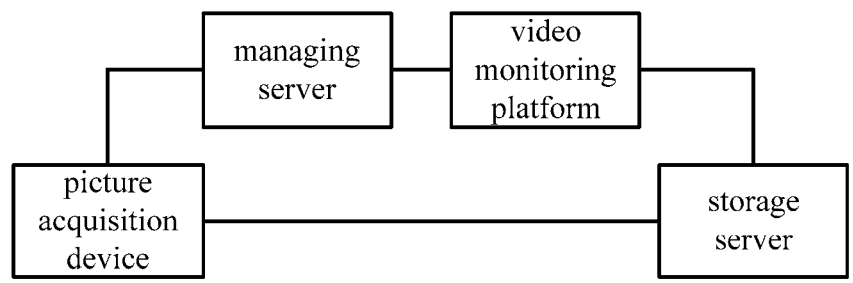
FIG. 8 is a schematic structural diagram of another video monitoring system according to an embodiment of the present application.

In an implementation of the present application, referring to FIG. 8, a schematic structural diagram of another video monitoring system is provided. Compared to the embodiment shown in FIG. 7, in this embodiment, the video monitoring system further includes a video monitoring platform, Specifically, the video monitoring platform is configured for sending a first resource query request to the managing server, wherein the first resource query request carries an identifier of a second encoder corresponding to a to-be-downloaded picture;

the managing server is configured for receiving the first resource query request, determining a second storage server storing the to-be-downloaded picture according to the identifier of the second encoder, and sending the identifier of the second encoder to the video monitoring platform;

the video monitoring platform is configured for receiving the identifier of the second encoder, and sending a first picture downloading request to the second storage server according to the received identifier, wherein the first picture downloading request carries an identifier of a second encoder corresponding to a to-be-downloaded picture, a first start time, and a first end time;

the second storage server is configured for receiving the first picture downloading request, determining a second storage block storing a picture corresponding to the second encoder according to the identifier of the second encoder; searching, in pictures stored in the second storage block, for a picture with a capture time and/or a storage time within a range from the first start time to the first end time; and send a searching result to the video monitoring platform;

the video monitoring platform is configured for receiving the searching result and sending a second picture downloading request to the second storage server according to the searching result;

the second storage server is configured for receiving the second picture downloading request, reading a picture according to the second picture downloading request and the searching result, and sending the read picture to the video monitoring platform;

the video monitoring platform is configured for receiving the picture sent by the second storage server.

Since each storage server may periodically feed back information of the pictures stored in each storage block to the managing server, for example, the identifiers of the encoders corresponding to the stored pictures in the storage block, the earliest capture time, the latest capture time, the earliest storage time, the latest storage time with respect to the stored pictures, the capture time and storage time of the stored pictures, and the like, the managing server can determine the second storage server according to the information fed back by the storage server after receiving the first resource query request.

After the storage server stores the to-be-stored picture, the storage server may also feed back a storage result for the to-be-stored picture to the picture acquisition device. After receiving the storage result, the picture acquisition device determines, according to the storage result, whether the to-be-stored picture is successfully stored. If the storage is successful, a first picture download link of the to-be-stored picture may be constructed according to the storage result, so that when there is need to download this picture in a later stage, the picture may be downloaded according to the first picture download link.

Specifically, the above storage result may include an offset of the to-be-stored picture in the first storage block, and may further include information such as the identifier of the first storage block, the identifier of the first storage server, and the like, which is not limited in the present application.

When the picture acquisition device creates the first picture download link, in addition to the above offset, the identifier of the first storage server and the identifier of the first storage block may also be considered.

Specifically, after the foregoing picture acquisition device constructs the first picture download link, the first picture download link may be sent to the video monitoring platform, the managing server, etc., so that when the staff downloads the to-be-stored picture through the video monitoring platform, the picture can be downloaded according to the first picture download link.

In view of the above situation, in an optional implementation of the present application, the first storage server is further configured for send, to the picture acquisition device, a storage result for the to-be-stored picture;

the picture acquisition device is further configured for creating a first picture download link of the to-be-stored picture according to the storage result in a case that the to-be-stored picture is successfully stored.

Based on the above optional implementation and the system shown in FIG. 8, in an implementation of the present application, the video monitoring platform is configured for sending a second resource query request to the managing server, wherein the second resource query request carries a second picture download link of the to-be-downloaded picture;

the managing server is configured for receiving the second resource query request, determining, according to the second picture download link, a second storage server storing the to-be-downloaded picture, and sending an identifier of the second storage server to the video monitoring platform;

the video monitoring platform is configured for receiving the identifier of the second storage server, and sending a third picture downloading request to the second storage server according to the received identifier, wherein the third picture downloading request carries the second picture download link;

the second storage server is configured for receiving the third picture downloading request, parsing the second picture download link, and determining a second storage block storing the to-be-downloaded picture and a first offset of a storage location of the to-be-downloaded picture in the second storage block; obtaining the to-be-downloaded picture from the second storage block according to the first offset, and feeding the to-be-downloaded picture back to the video monitoring platform;

the video monitoring platform is configured for receiving the picture fed back by the second storage server.

In an implementation of the present application, the video monitoring platform is configured for sending a video playback request to the second storage server, wherein the video playback request is a request for playing back a video associated with a third picture in the to be downloaded pictures;

the second storage server is configured for receiving the video playback request, determining a second capture time of the third picture, determining a playback video according to the second capture time, and sending the playback video to the video monitoring platform;

the video monitoring platform is configured for receiving the playback video.

In an implementation of the present application, the managing server is configured for generating a storage space release instruction when detecting that the first storage server meets a storage space release condition, wherein the storage space release instruction carries a second end time and information of an encoder corresponding to a to-be-deleted picture;

the first storage server is configured for receiving the storage space release instruction, determining, according to the information of the encoder, a third storage block in which the to-be-deleted picture is stored, and deleting pictures in the third storage block with storage time earlier than the second end time, and releasing the storage space.

In an implementation of the present application, the picture acquisition device is configured for sending a stopping picture writing instruction to the first storage server;

the first storage server is configured for receiving the stopping picture writing instruction, and recycling the first storage block.

It can be seen from the above that, in the solutions provided by each embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

An embodiment of the present application also provides a server, where the server is a storage server in a video monitoring system, where the video monitoring system includes a storage server and a picture acquisition device, where the storage server includes a processor, a communication interface, a memory, and a communication bus, wherein the processor, the communication interface, and the memory communicate with each other via the communication bus;

the memory is configured to store a computer program;

the processor is configured to implement the picture storage method described in the embodiment of the present application when executing the program stored in the memory.

Specifically, the picture storage method includes:

receiving, from the picture acquisition device, a picture writing request for a to-be-stored picture;

determining a first storage block for storing the to-be-stored picture according to the picture writing request;

sending, to the picture acquisition device, a first identifier of the first storage block;

receiving target picture data sent by the picture acquisition device according to the first identifier, wherein the target picture data comprises the to-be-stored picture and a first capture time of the to-be-stored picture;

storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the pictures.

It should be noted that the other embodiments of the picture storage method implemented by the processor executing the program stored in the memory are the same as the embodiments of the picture storage method mentioned in the foregoing method embodiment, thus are not described herein.

The communication bus mentioned in the above service may be a Peripheral Component Interconnect (PCI) bus or an Extended Industry Standard Architecture (EISA) bus. The communication bus can be divided into an address bus, a data bus, a control bus, and the like. For convenience of representation, only one thick line is shown in the drawings, but it does not mean that there is only one bus or one type of bus.

The communication interface is used for communication between the above server and other devices.

The memory may include a random access memory (RAM), and may also include a non-volatile memory (NVM), such as at least one disk storage. Optionally, the memory may also be at least one storage device located away from the aforementioned processor.

The above processor may be a general-purpose processor, including a central processing unit (CPU), a network processor (NP), etc.; or may be a Digital Signal Processing (DSP), Application Specific Integrated Circuit (ASIC), Field-Programmable Gate Array (FPGA) or other programmable logic device, discrete gate or transistor logic device, discrete hardware component.

It can be seen from the above that, in the solutions provided by the present embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

An embodiment of the present application also provides a computer readable storage medium, which is a storage medium of a storage server in a video monitoring system, where the video monitoring system includes a storage server and a picture acquisition device, wherein the computer readable storage medium stores a computer program, and the computer program implements the picture storage method described in the embodiment of the present application when being executed by a processor.

Specifically, the picture storage method includes:

receiving, from the picture acquisition device, a picture writing request for a to-be-stored picture;

determining a first storage block for storing the to-be-stored picture according to the picture writing request;

sending, to the picture acquisition device, a first identifier of the first storage block;

receiving target picture data sent by the picture acquisition device according to the first identifier, wherein the target picture data comprises the to-be-stored picture and a first capture time of the to-be-stored picture;

storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the pictures.

It should be noted that the other embodiments of the picture storage method implemented by the processor executing the program are the same as the embodiments of the picture storage method mentioned in the foregoing method embodiment, thus are not described herein.

It can be seen from the above that, in the solutions provided by the present embodiment of the present application, when executing the computer program stored in the computer readable storage medium, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

An embodiment of the present application also provides an application program, which is used to implement the picture storage method described in the embodiment of the present application when being executed.

Specifically, the picture storage method includes:

receiving, from the picture acquisition device, a picture writing request for a to-be-stored picture;

determining a first storage block for storing the to-be-stored picture according to the picture writing request;

sending, to the picture acquisition device, a first identifier of the first storage block;

receiving target picture data sent by the picture acquisition device according to the first identifier, wherein the target picture data comprises the to-be-stored picture and a first capture time of the to-be-stored picture;

storing the to-be-stored picture to the first storage block, determining a first storage time of the to-be-stored picture, and storing the first storage time and the first capture time into a first information sub-block of the first storage block, wherein an information sub-block of each storage block of the storage server records a corresponding relationship among pictures stored in that storage block, storage time of the pictures and capture time of the pictures.

It should be noted that the other embodiments of the picture storage method implemented by executing the program are the same as the embodiments of the picture storage method mentioned in the foregoing method embodiment, thus are not described herein.

It can be seen from the above that, when executing the application program provided by the present embodiment of the present application, after the storage server receives the picture writing request for the to-be-stored picture sent by the picture acquisition device, the storage server determines, according to the picture writing request, a first storage block for storing the to-be-stored picture, then sends a first identifier of the first storage block to the picture acquisition device, receives the target picture data sent by the picture acquisition device according to the first identifier, and stores the to-be-stored picture in the first storage block, determines the first storage time of the to-be-stored picture, and stores the first storage time and the first capture time into the first information sub-block of the first storage block. Since the storage time of the picture is stored in addition to the picture capture time when the picture is stored and the storage time of the pictures is determined by the system time of the storage server, which is relatively stable due to the fact that the storage server is usually in a computer room that is less affected by external factors, a relatively stable picture storage time can be considered when retrieving a picture stored by applying the solution provided by the embodiments of the present application, thereby reducing the probability of incorrect picture retrieval result.

For the picture storage apparatus, the video monitoring system, the server, the computer readable storage medium and the application embodiment, since it is basically similar to the method embodiment, the description is relatively simple, and reference can be made to the relevant part of the method embodiment.

It should be noted that, in the claims and the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

A person skilled in the art can understand that all or part of the steps in implementing the foregoing method embodiments can be completed by a program to instruct related hardware, and the program can be stored in a computer readable storage medium, as referred to herein. Storage media such as ROM/RAM, disk, CD, etc.

The above description is only the preferred embodiment of the present application, and is not intended to limit the protection scope of the present application. Any modifications, equivalent substitutions, improvements, etc. made within the spirit and principles of the present application fall within the scope of the present application.

The invention claimed is:

1. A picture storage method, which is applied in a storage server in a video monitoring system, wherein the video monitoring system comprises a storage server and a picture acquisition device, and the method comprises:
   receiving, from the picture acquisition device, a picture writing request for a to-be-stored picture;
   determining a first storage block for storing the to-be-stored picture according to the picture writing request;
   sending, to the picture acquisition device, a first identifier of the first storage block;
   receiving target picture data sent by the picture acquisition device according to the first identifier, wherein the target picture data comprises the to-be-stored picture and a first capture time of the to-be-stored picture;
   storing the to-be-stored picture to the first storage block, determining a first storage time at which the to-be-stored picture is stored in the first storage block, and storing the first storage time and the first capture time into a first information sub-block of the first storage block, wherein an information sub-block of each storage block of the storage server records a corresponding relationship among pictures stored in that storage block, storage time of the pictures and capture time of the pictures.

2. The method according to claim 1, wherein,
   the picture writing request carries an identifier of a first encoder corresponding to the to-be-stored picture;

the information sub-block of each storage block of the storage server further records identifiers of encoders corresponding to the pictures stored in that storage block; and the determining a first storage block for storing the to-be-stored picture according to the picture writing request comprises:

determining the first storage block for storing the to-be-stored picture according to the identifier of the first encoder and the identifiers of the encoders recorded in the information sub-blocks of each storage block of the storage server.

3. The method according to claim 1, wherein, the information sub-block of each storage block of the storage server further records an earliest capture time, a latest capture time, an earliest storage time, and a latest storage time with respect to the stored pictures;

the method further comprises:
updating, according to the first capture time, the earliest capture time and/or the latest capture time recorded in the first information sub-block; and
updating, according to the first storage time, the earliest storage time and/or the latest storage time recorded in the first information sub-block.

4. The method according to claim 3, wherein the video monitoring system further comprises a video monitoring platform, and the method further comprises:

receiving a first picture downloading request sent by the video monitoring platform, wherein the first picture downloading request carries an identifier of a second encoder corresponding to a to-be-downloaded picture, a first start time, and a first end time;
determining, according to the identifier of the second encoder, a second storage block storing a picture corresponding to the second encoder;
searching, in pictures stored in the second storage block, for a picture with a capture time and/or a storage time within a range from the first start time to the first end time;
sending a searching result to the video monitoring platform;
receiving a second picture downloading request sent by the video monitoring platform according to the searching result; and
reading a picture according to the second picture downloading request and the searching result, and sending the read picture to the video monitoring platform.

5. The method according to claim 4, wherein the method further comprises:

receiving a video playback request sent by the video monitoring platform, wherein the video playback request is a request for playing back a video associated with a third picture in the to be downloaded pictures;
determining a second capture time of the third picture;
determining a playback video according to the second capture time;
sending the playback video to the video monitoring platform.

6. The method according to claim 1, wherein the method further comprises:

sending, to the picture acquisition device, a storage result for the to-be-stored picture, so that the picture acquisition device creates a first picture download link of the to-be-stored picture according to the storage result in a case that the to-be-stored picture is successfully stored.

7. The method according to claim 6, wherein the video monitoring system further comprises a video monitoring platform, and the method further comprises:

receiving a third picture downloading request sent by the video monitoring platform, wherein the third picture downloading request carries a second picture download link of a to-be-downloaded picture;
parsing the second picture download link, and determining a second storage block storing the to-be-downloaded picture and a first offset of a storage location of the to-be-downloaded picture in the second storage block;
obtaining the to-be-downloaded picture from the second storage block according to the first offset, and feeding the to-be-downloaded picture back to the video monitoring platform.

8. The method according to claim 1, wherein the video monitoring system further comprises a managing server, and the method further comprises:

receiving a storage space release instruction sent by the managing server, wherein the storage space release instruction carries a second end time and information of an encoder corresponding to a to-be-deleted picture;
determining, according to the information of the encoder, a third storage block in which the to-be-deleted picture is stored; and
deleting pictures in the third storage block with storage time earlier than the second end time, and releasing the storage space.

9. The method according to claim 1, wherein the method further comprises:

receiving a stopping picture writing instruction sent by the picture acquisition device, and recycling the first storage block.

10. A video monitoring system, comprising: a managing server, a storage server, and an a picture acquisition device, wherein, the picture acquisition device is configured for sending, to the managing server, a resource allocation request for a to-be-stored picture;
the managing server is configured for receiving the resource allocation request, and determining a first storage server according to the resource allocation request, and sending an identifier of the first storage server to the picture acquisition device;
the picture acquisition device is configured for receiving the identifier of the first storage server, and sending a picture writing request for the to-be-stored picture according to the received identifier;
the first storage server is configured for receiving the picture writing request, determining a first storage block for storing the to-be-stored picture according to the picture writing request; and send, to the picture acquisition device, a first identifier of the first storage block;
the picture acquisition device is configured for receiving the first identifier, generating target picture data according to the to-be-stored picture and a first capture time of the to-be-stored picture, and sending the target picture data to the first storage server according to the first identifier;
the first storage server is configured for receiving the target picture data, storing the to-be-stored picture to the first storage block, determining a first storage time at which the to-be-stored picture is stored in the first storage block, and storing the first storage time and the first capture time into a first information sub-block of the first storage block, wherein an information sub-block of each storage block of the storage server records a corresponding relationship among pictures stored in that storage block, storage time of the pictures and capture time of the picture.

11. The system according to claim 10, wherein, the picture writing request carries an identifier of a first encoder corresponding to the to-be-stored picture;

the information sub-block of each storage block of the storage server further records identifiers of encoders corresponding to the pictures stored in that storage block; and the first storage server is further configured for determining the first storage block for storing the to-be-stored picture according to the identifier of the first encoder and the identifiers of the encoders recorded in the information sub-blocks of each storage block of the storage server.

12. The system according to claim 10, wherein, the information sub-block of each storage block of the storage server further records an earliest capture time, a latest capture time, an earliest storage time, and a latest storage time with respect to the stored pictures;

the first storage server is further configured for updating, according to the first capture time, the earliest capture time and/or the latest capture time recorded in the first information sub-block; and updating, according to the first storage time, the earliest storage time and/or the latest storage time recorded in the first information sub-block.

13. The system according to claim 12, wherein the video monitoring system further comprises a video monitoring platform, the video monitoring platform is configured for sending a first resource query request to the managing server, wherein the first resource query request carries an identifier of a second encoder corresponding to a to-be-downloaded picture;

the managing server is configured for receiving the first resource query request, determining a second storage server storing the to-be-downloaded picture according to the identifier of the second encoder, and sending the identifier of the second encoder to the video monitoring platform;

the video monitoring platform is configured for receiving the identifier of the second encoder, and sending a first picture downloading request to the second storage server according to the received identifier, wherein the first picture downloading request carries an identifier of a second encoder corresponding to a to-be-downloaded picture, a first start time, and a first end time;

the second storage server is configured for receiving the first picture downloading request, determining a second storage block storing a picture corresponding to the second encoder according to the identifier of the second encoder; searching, in pictures stored in the second storage block, for a picture with a capture time and/or a storage time within a range from the first start time to the first end time; and send a searching result to the video monitoring platform;

the video monitoring platform is configured for receiving the searching result and sending a second picture downloading request to the second storage server according to the searching result;

the second storage server is configured for receiving the second picture downloading request, reading a picture according to the second picture downloading request and the searching result, and sending the read picture to the video monitoring platform;

the video monitoring platform is configured for receiving the picture sent by the second storage server.

14. The system according to claim 13, wherein, the video monitoring platform is configured for sending a video playback request to the second storage server, wherein the video playback request is a request for playing back a video associated with a third picture in the to be downloaded pictures;

the second storage server is configured for receiving the video playback request, determining a second capture time of the third picture, determining a playback video according to the second capture time, and sending the playback video to the video monitoring platform;

the video monitoring platform is configured for receiving the playback video.

15. The system according to claim 10, wherein, the first storage server is further configured for send, to the picture acquisition device, a storage result for the to-be-stored picture;

the picture acquisition device is further configured for creating a first picture download link of the to-be-stored picture according to the storage result in a case that the to-be-stored picture is successfully stored.

16. The system according to claim 15, wherein, the video monitoring system further comprises a video monitoring platform, the video monitoring platform is configured for sending a second resource query request to the managing server, wherein the second resource query request carries a second picture download link of the to-be-downloaded picture;

the managing server is configured for receiving the second resource query request, determining, according to the second picture download link, a second storage server storing the to-be-downloaded picture, and sending an identifier of the second storage server to the video monitoring platform;

the video monitoring platform is configured for receiving the identifier of the second storage server, and sending a third picture downloading request to the second storage server according to the received identifier, wherein the third picture downloading request carries the second picture download link;

the second storage server is configured for receiving the third picture downloading request, parsing the second picture download link, and determining a second storage block storing the to-be-downloaded picture and a first offset of a storage location of the to-be-downloaded picture in the second storage block; obtaining the to-be-downloaded picture from the second storage block according to the first offset, and feeding the to-be-downloaded picture back to the video monitoring platform;

the video monitoring platform is configured for receiving the picture fed back by the second storage server.

17. The system according to claim 10, wherein, the managing server is configured for generating a storage space release instruction when detecting that the first storage server meets a storage space release condition, wherein the storage space release instruction carries a second end time and information of an encoder corresponding to a to-be-deleted picture;

the first storage server is configured for receiving the storage space release instruction, determining, according to the information of the encoder, a third storage block in which the to-be-deleted picture is stored, and deleting pictures in the third storage block with storage time earlier than the second end time, and releasing the storage space.

18. The system according to claim 10, wherein, the picture acquisition device is configured for sending a stopping picture writing instruction to the first storage server;

the first storage server is configured for receiving the stopping picture writing instruction, and recycling the first storage block.

19. A server, wherein the server is a storage server in a video monitoring system, and the video monitoring system comprises a storage server and a picture acquisition device, the storage server comprises a processor, a communication interface, a memory, and a communication bus, the processor, the communication interface, and the memory communicate with each other via the communication bus;

the memory is configured to store a computer program;

the processor is configured to implement the method according to claim 1 when executing the program stored in the memory.

20. A non-transitory computer readable storage medium, wherein the computer readable storage medium is a storage medium of a storage server in a video monitoring system, the video monitoring system comprises a storage server and a picture acquisition device, the computer readable storage medium stores a computer program, and the computer program implements the method according to claim 1 when being executed by a processor.

* * * * *